United States Patent
Zucker et al.

(10) Patent No.: US 8,369,693 B2
(45) Date of Patent: Feb. 5, 2013

(54) VISUAL INFORMATION STORAGE METHODS AND SYSTEMS

(75) Inventors: Brian Todd Zucker, Austin, TX (US); Thomas Alexander Shows, Leander, TX (US)

(73) Assignee: Dell Products L.P., Round Rock, TX (US)

(*) Notice: Subject to any disclaimer, the term of this patent is extended or adjusted under 35 U.S.C. 154(b) by 872 days.

(21) Appl. No.: 12/412,537

(22) Filed: Mar. 27, 2009

(65) Prior Publication Data
US 2010/0247079 A1    Sep. 30, 2010

(51) Int. Cl.
H04N 5/89    (2006.01)
(52) U.S. Cl. ........................................ 386/335
(58) Field of Classification Search ............ 386/106, 386/95, 52, 278, 124; 348/51, 42, 43, 241, 348/340, 46; 375/240.01
See application file for complete search history.

(56) References Cited

U.S. PATENT DOCUMENTS

| | | | |
|---|---|---|---|
| 6,041,345 A | 3/2000 | Levi et al. | |
| 6,574,423 B1 | 6/2003 | Oshima et al. | |
| 2009/0003172 A1* | 1/2009 | Yahata et al. | 369/53.41 |
| 2009/0220213 A1* | 9/2009 | Ogawa et al. | 386/95 |
| 2010/0177161 A1* | 7/2010 | Curtis et al. | 348/43 |
| 2010/0231593 A1* | 9/2010 | Zhou et al. | 345/428 |

OTHER PUBLICATIONS

Petrovic et al., "Stereoscopic and Multiple-Perspective Video Streaming System", 2007, http://www.cs.vu.nl/ishare/public/IhShare-P79v1.0.pdf, pp. 1-8.*
Goran Petrovic and Peter H.N. De With, Stereoscopic and Multiple-Perspective Video Steaming System, found on University of Amsterdam website: http://www.cs.vu.nl/ishare/public.

* cited by examiner

Primary Examiner — Jeffrey Pwu
Assistant Examiner — Hee Song
(74) Attorney, Agent, or Firm — Baker Botts L.L.P.

(57) ABSTRACT

A method for storing visual information on a storage medium is disclosed, whereby the method includes receiving a first visual information corresponding to a left eye and a second visual information corresponding to a right eye. The method further includes storing the first visual information in a first stream and the second visual information in a second stream on the storage medium, wherein the first stream and the second stream are each stored at full resolution. An information handling system (IHS) is further disclosed including a storage medium operable to store, at full resolution, a first stream of visual information corresponding to a left eye and a second stream of visual information corresponding to a right eye, wherein the first stream and the second stream are each stored at full resolution. The system may further include a playback device operable to read the storage medium and display the visual information.

14 Claims, 3 Drawing Sheets

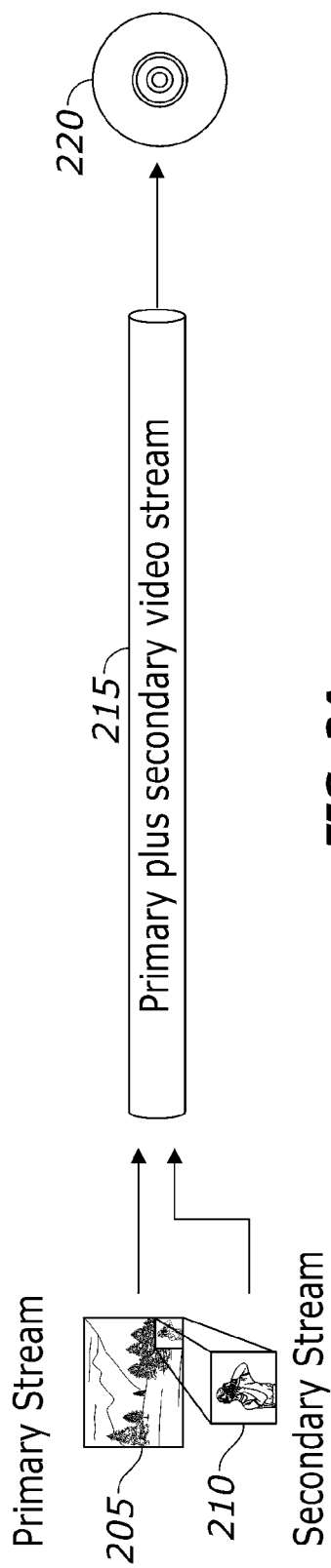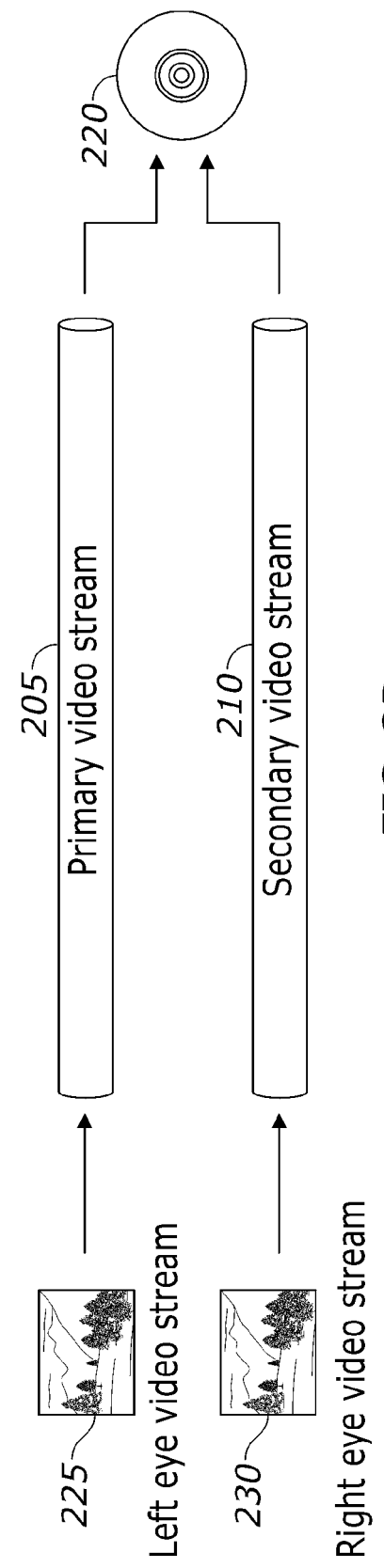
FIG. 2A
(Prior Art)
FIG. 2B

VISUAL INFORMATION STORAGE METHODS AND SYSTEMS

TECHNICAL FIELD

The present disclosure relates generally to the field of information handling systems, and more specifically, to storing visual information on information handling systems.

BACKGROUND

As the value and use of information continues to increase, individuals and businesses seek additional ways to process and store information. One option available to users is an information handling system (IHS). An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for such systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Furthermore, some IHSs may be employed to manage visual information such as stereoscopic video data. In its raw format, stereoscopic video data may be represented as two distinct, high resolution sequential sets of video frames. During the production process, these high quality image streams may be compressed using a variety of frequency and motion estimation steps depending on the encoding method used. Further, various stereoscopic encoding methods may leverage common data between the two distinct streams by looking for patterns in temporal, spatial, and intraframe areas. While such methods may provide the advantage of higher compression thereby reducing file sizes, they may also compromise image quality. The degradation in video quality may become significantly apparent in cases where encoding methods merge the distinct sets of streams into a single stream of video frames. Such methods may include half-resolution, frame interleave, time-sequential formatting, and/or the like.

Current methods of storing stereoscopic video data may rely on the aforementioned encoding techniques. However, such encoding methods may introduce undesirable complexity in the de-multiplexing and decoding stages of video processing. Often times, such complexities may result in visible artifacts degrading the entire viewing experience. In particular, half-resolution video that is encoded with intraframe frequency and motion estimation may experience significant reduction in quality. In certain instances, these methods can result in the loss of up to 75% of the original pixel data per frame of video. Thus, a need exists for methods and systems for preserving the maximum video quality of visual information, such as stereoscopic video data, after encoding.

SUMMARY

The following presents a general summary of several aspects of the disclosure in order to provide a basic understanding of at least some aspects of the disclosure. This summary is not an extensive overview of the disclosure. It is not intended to identify key or critical elements of the disclosure or to delineate the scope of the claims. The following summary merely presents some concepts of the disclosure in a general form as a prelude to the more detailed description that follows.

One aspect of the disclosure provides for a method for storing visual information on a storage medium. The method includes receiving a first visual information corresponding to a left eye and a second visual information corresponding to a right eye. The method further includes storing the first visual information in a first stream and the second visual information in a second stream on the storage medium, wherein the first stream and the second stream are each stored at full resolution.

Another aspect of the present disclosure provides for an information handling system (IHS). The IHS may include a storage medium operable to store, at full resolution, a first stream of visual information corresponding to a left eye and a second stream of visual information corresponding to a right eye, wherein the first stream and the second stream are each stored at full resolution. The system may further include a playback device operable to read the storage medium and display the visual information.

A further aspect of the present disclosure provides for a method for storing visual information in an information handling system (IHS) including providing a storage medium to store a first stream and a second stream of visual information. The method further includes receiving a first visual information corresponding to a left eye and a second visual information corresponding to a right eye. Moreover, the method includes storing the first visual information in the first stream and the second visual information in the second stream, wherein the first stream and the second stream are each stored at a resolution of at least 1080 p.

Yet another aspect of the present invention provides for a computer-readable medium having computer-executable instructions for performing a method for storing visual information on a storage medium. The method includes receiving a first visual information corresponding to a left eye and a second visual information corresponding to a right eye. The method further includes storing the first visual information in a first stream and the second visual information in a second stream on the storage medium, wherein the first stream and the second stream are each stored at full resolution.

Another aspect of the present invention provides for a computer-readable medium having computer-executable instructions for performing a method for storing visual information in an information handling system (IHS) including providing a storage medium to store a first stream and a second stream of visual information. The method further includes receiving a first visual information corresponding to a left eye and a second visual information corresponding to a right eye. Moreover, the method includes storing the first visual information in the first stream and the second visual information in the second stream, wherein the first stream and the second stream are each stored at a resolution of at least 1080 p.

BRIEF DESCRIPTION OF THE DRAWINGS

For detailed understanding of the present disclosure, references should be made to the following detailed description of the several aspects, taken in conjunction with the accompanying drawings, in which like elements have been given like numerals and wherein:

FIG. 2A represents a schematic in the prior art for storing visual information;

FIG. 2B represents a schematic of a computer-readable medium operable to store visual information in accordance with one aspect of the present disclosure.

DETAILED DESCRIPTION

Figure 1:
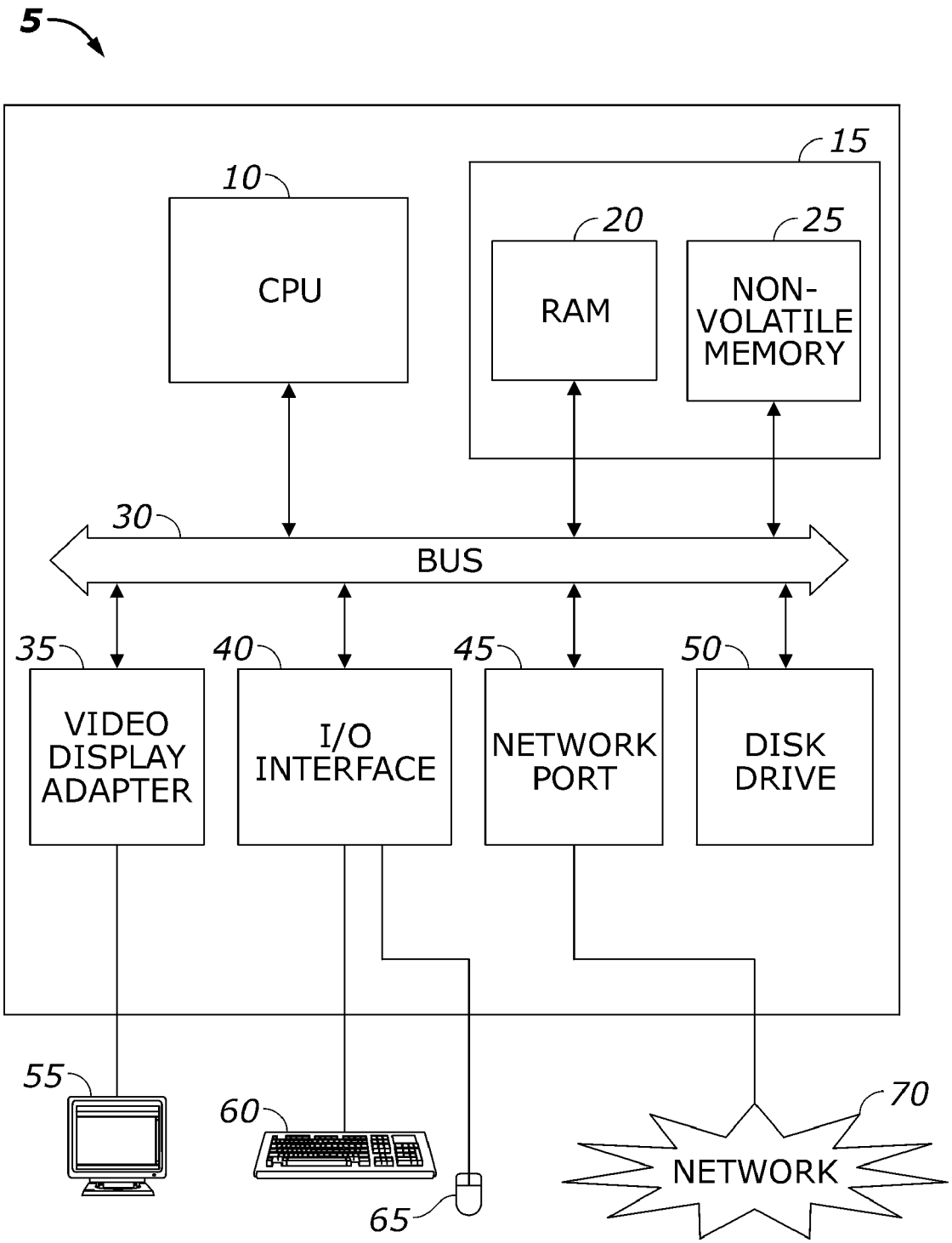
FIG. 1 represents a an information handling system (IHS) in accordance with one aspect of the present disclosure.

Before the present systems, methods, and computer-readable media are described, it is to be understood that this disclosure is not limited to the particular systems, methods, and media described, as such may vary. One of ordinary skill in the art should understand that the terminology used herein is for the purpose of describing possible aspects, embodiments and/or implementations only, and is not intended to limit the scope of the present disclosure which will be limited only by the appended claims.

It must also be noted that as used herein and in the appended claims, the singular forms "a," "and," and "the" may include plural referents unless the context clearly dictates otherwise. Thus, for example, reference to "an image" refers to one or several images and reference to "a method of processing" includes reference to equivalent steps and methods known to those skilled in the art, and so forth.

This disclosure is not limited in its application to the details of construction and the arrangement of components set forth in the following description or illustrated in the drawings. The disclosure is capable of other embodiments, implementations or aspects and of being practiced or of being carried out in various ways. Also, the use of "including," "comprising," "having," "containing," "involving," "consisting" and variations thereof, is meant to encompass the items listed thereafter and equivalents thereof as well as additional items.

Generally, the present disclosure relates to visual information received, handled, and/or displayed on an information handling system (IHS). Although the disclosure provides illustration by way of video data, such as stereoscopic data and the like, one of ordinary skill the art would understand that any suitable type of visual information is also contemplated. Visual information, as used herein, may correspond to any type of data (e.g., digital data) associated with a visual object or image viewable on an information handling system or electronic device, such as through a display.

For purposes of this disclosure, an embodiment of an Information Handling System (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS may be a personal computer, a storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to transmit data communications between the various hardware components.

FIG. 1 illustrates one possible implementation of an IHS 5 comprising CPU 10. It should be understood that the present disclosure has applicability to IHSs as broadly described above, and is not intended to be limited to the IHS 5 as specifically described. The CPU 10 or controller may comprise a processor, a microprocessor, minicomputer, or any other suitable device, including combinations and/or a plurality thereof, for executing programmed instructions. It is appreciated that execution of the algorithm to be described below occurs in the processor or the CPU 10. The CPU 10 may be in data communication over a local interface bus 30 with components including memory 15 and input/output interfaces 40. The system memory 15, as illustrated, may include non-volatile memory 25. The non-volatile memory 25 may include, but is not limited to, flash memory, non-volatile random access memory (NVRAM), and electrically erasable programmable read-only memory (EEPROM). The non-volatile memory 25 may contain a firmware program (not shown) which may contain programming and/or executable instructions required to control a keyboard 60, mouse 65, video display 55 and/or other input/output devices not shown here. This type of firmware may be known as a basic input/output system (BIOS). The system memory 15 may also comprise random access memory (RAM) 20. The operating system and application programs (e.g., graphical user interfaces) may be loaded into the RAM 20 for execution.

The IHS 5 may be implemented with a network port 45 to permit communication over a network 70 such as a local area network (LAN) or a wide area network (WAN), such as the Internet. As understood by those skilled in the art, IHS 5 implementations may also include an assortment of ports and interfaces for different peripherals and components, such as video display adapters 35, disk drives port 50, and input/output interfaces 40 (e.g., keyboard 60, mouse 65).

An IHS, typically a computer or network system, may be coupled to an electronic device such as a compact disc (CD), digital video/virtual disc (DVD) player, Blu-ray player, or the like. Furthermore, examples of IHSs may include, but are not limited to, a computer or network system, CD or DVD player, Blu-ray player, or any suitable instrumentality to sense, receive, handle, and/or process visual information.

Turning now to FIG. 2A, a schematic illustrating a prior art format for storing visual information, such as video data on a storage medium, is provided. Stereoscopic three-dimensional (3D) video data, as one example of video data, may refer to video content capable of creating an illusion of depth from an otherwise two-dimensional (2D) image. Stereoscopic imaging techniques may achieve this illusion by presenting a slightly different image to each eye. To this end, an IHS may create a depth perception in the brain by providing the eyes of a viewer with two different images (i.e., an image corresponding to each eye), representing two perspectives of an object. Each eye of an individual may receive visual information within distinct streams (i.e., media for carrying information), as discussed below. As such, the presentation of stereoscopic video data may require storing visual information related to each image for each eye. Typically, viewing stereoscopic images may require the use of special lenses, glasses, or other conventional methods of viewing images.

As illustrated in FIG. 2A, storage media, such as a computer-readable medium 220 for storing the stereoscopic video data may be a Blu-ray disc, for example. A Blu-ray disc may be one example of an optical disc storage medium capable of storing high-definition video and other data. While having the same physical dimensions of a DVD and a CD, the Blu-ray disc may, in some instances, be capable of storing more than ten times the amount of data than a DVD. To this end, a Blu-ray disc may be able to store high definition video content at full resolution. High definition may refer to any display resolution greater than that of standard definition, and full resolution may refer to high definition content stored with a display resolution of at least 1920×1080 pixels or 1080 p. In the previous example, the number 1,080 corresponds to 1,080 lines of vertical resolution (i.e., horizontal scan lines), while p stands for progressive scanning in which all lines of each frame of the moving images are drawn in sequence. Full resolution content may provide superior image quality to standard definition sources or even DVDs and may become the preferred resolution at which to distribute video content.

Further, Blu-ray discs may require the encoding of visual information in specific formats by way of software application residing on the IHS. The software application may provide an implementation of how the visual information is compressed and/or stored on a storage medium, such as a Blu-ray disc. For example, currently Blu-ray specifications may require that visual information such as video data be encoded with in a format such as the Movie Pictures Expert Group-2 (MPEG-2) format, the h.264 or MPEG-4 format, or Society of Motion Picture and Television Engineers (SMPTE) VC-1 format. In the example of stereoscopic 3D video data, each of the visual information corresponding to a left eye and a right eye may be encoded in one of the aforementioned formats. The format of the left eye visual information may be encoded in either the same or a distinct format as that of the right eye information. It should be noted, however, that the present disclosure is not limited to these encoding formats and may encompass a wide variety of other encoding techniques as well.

As depicted in FIG. 2A, the Blu-ray specifications may currently provide for a primary video stream 205 capable of displaying two-dimensional (2D) video content in full resolution. In one example, the primary video stream 205 may hold a full 1080 p movie. Furthermore, the Blu-ray disc may also enable a secondary video stream 210 to be used as a video overlay over the primary stream. As used herein, video overlay may refer to a technique in which one video stream is displayed across the entire screen of a display while a second video stream is simultaneously displayed in an inset window over the first stream. Video overlay techniques may require the use of two separate video sources or video streams as exhibited by the primary 205 and second stream 210 on the Blu-ray disc 220a. By way of example, a first stream (i.e., primary stream) may hold a full 1080 p movie while a second stream (i.e., secondary stream) may serve as a video overlay to the first stream. In some instances, video overlay may be referred to as Picture-in-Picture (PiP).

According to current Blu-ray specifications, both the primary video stream 205 and the secondary video stream 210 may be limited to sharing a pipeline 215 to store both the primary and secondary video streams, having a composite maximum bandwidth of about 40 Megabits per second (Mb/s). Additionally, because the secondary video stream 210 may be primarily used as a video overlay, the secondary video stream 210 may typically use a significantly lower amount of bandwidth than the primary video stream 205. Consequently, the secondary video stream 210 may, in some instances, not be capable of displaying video content in full resolution without a large amount of video compression, which may result in significant loss of data from the original video content. Moreover, if the bandwidth of the pipeline 215 remains constant, increasing the bandwidth of the secondary video stream 210 from an original bandwidth to an enhanced bandwidth may necessarily result in lowering an original bandwidth of the primary video stream 205, which may cause the primary video stream 205 to experience image degradation as well.

However, because the current Blu-ray specification currently provides for two video streams, Blu-ray discs may provide a useful framework for storing stereoscopic video data. Indeed, each of the video data from the left eye and the right eye may be stored in one of a first stream or second stream, respectively. However, due to the aforementioned bandwidth limitations in the pipeline 250, current Blu-ray discs may not be capable of storing such stereoscopic video data without significant loss of data from the original video source and considerable image degradation.

FIG. 2B provides a storage medium (e.g., computer-readable medium) operable to store visual information, such as stereoscopic video data, in accordance with one aspect of the present disclosure. Specifically, FIG. 2B illustrates a left eye video stream 225 as the primary video stream 205 having a minimum bandwidth of at least 40 Mb/s, for example, and a right eye video stream 230 as the secondary video stream 210 also having a bandwidth of at least 40 Mb/s, for example, stored on the computer readable medium 220. Notably, both the left eye video stream 225 and the right eye video stream 230 may have the same bandwidth (e.g., 40 Mb/s) so as not to create a disparity in image quality between the two eyes. In one implementation, the computer readable medium may be a Blu-ray disc associated with a modified specification that incorporates the increase in bandwidth. As such, certain video playback devices (e.g., a Blu-ray player) may also be modified in order read the Blu-ray disc and display its contents (i.e., the stereoscopic video data). In addition, both the left eye video stream and the right eye video stream may be capable of displaying video data in full resolution. Furthermore, because each video stream may have at least 40 Mb/s in bandwidth, significant image degradations associated with insufficient bandwidth may be avoided or reduced. Taking the left eye and right eye video streams together, a total of at least 80 Mb/s may be allocated on a Blu-ray disc for video playback.

Moreover, because two separate streams may be provided for left eye video data and right eye video data respectively, each stream may also be encoded with different formats, as previously mentioned. For example, the left eye video stream 225 may be encoded with the h.264 or MPEG-4 format while the right eye video stream 230 may be encoded with the SMPTE VC-1 format. Thus, flexibility in encoding methods for the left eye video stream and right eye video stream may be realized by the present disclosure.

While FIG. 2B has been described with reference to the computer readable medium 220 as a Blu-ray disc, the present disclosure is not limited to the Blu-ray Format. Any storage medium format operable to store two video streams are also contemplated within the present disclosure. Furthermore, though the present disclosure mentions increasing the bandwidth of each of the primary stream 205 and secondary stream 210 to at least 40 Mb/s, increasing the bandwidth to other bandwidth values may also be suitable. The present disclosure merely contemplates increasing the bandwidth of both streams such that most of the video data may be preserved from the original video source. Additionally, the storage of the left and right eye video stream may be reversed such that the right eye video stream 230 may be stored in the primary video stream 205, and the left eye video stream 225 may be stored in the secondary video stream 210. Furthermore, the current Blu-ray specification may be modified to incorporate the increase in bandwidth for the left eye video stream and the right eye video stream. As such, Blu-ray playback devices may also be modified to incorporate the changes in the Blu-ray specification before being able to display the stereoscopic video data.

Figure 3:
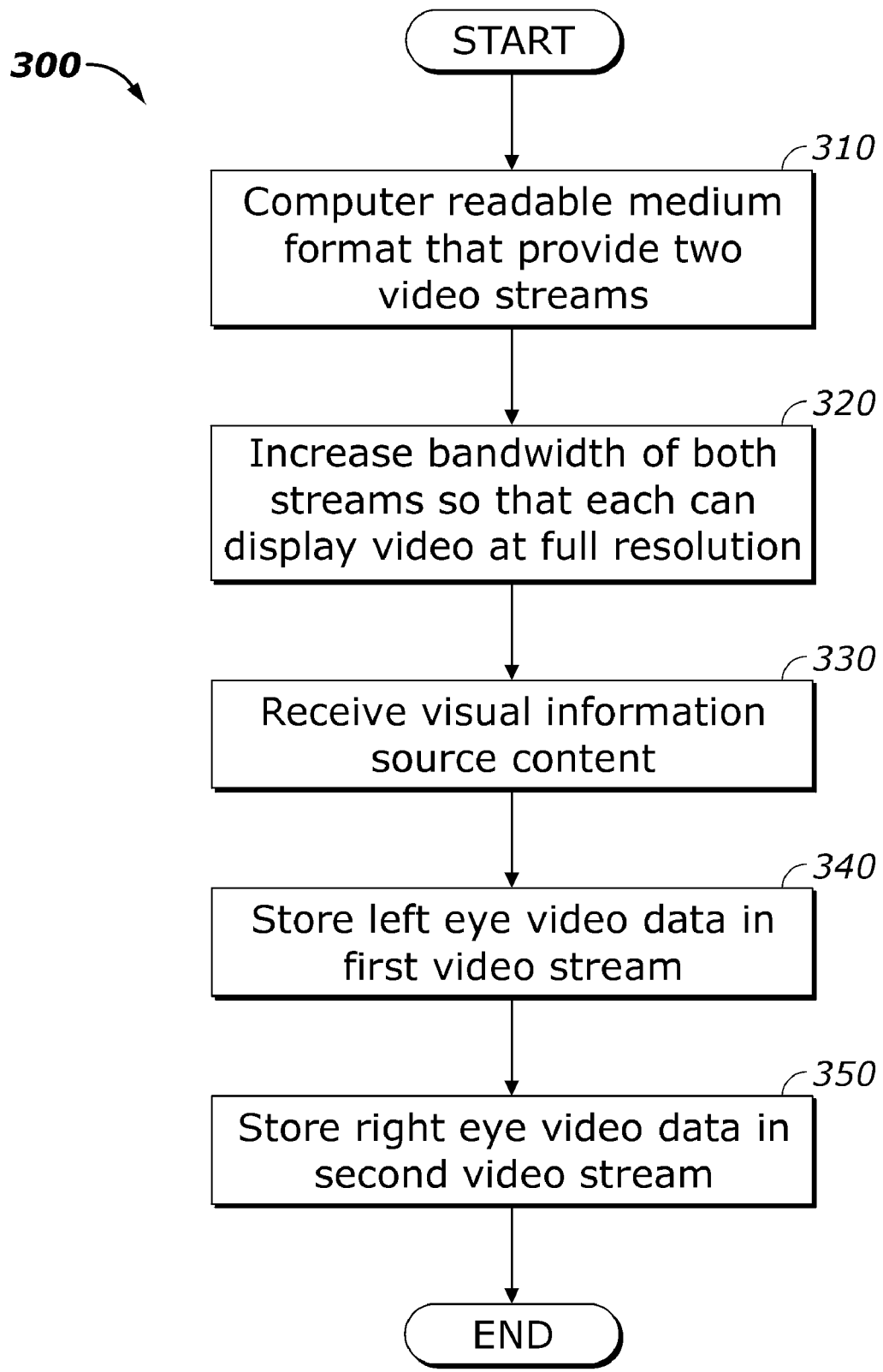
FIG. 3 represents a flow diagram of a method for storing visual information in accordance with one aspect of the present disclosure.

Turning now to FIG. 3, a flow diagram is represented that provides a method, indicated generally at 300, for storing visual information such as stereoscopic video data in accordance with one aspect of the present disclosure. The method may begin in step 310, where a storage medium such as a computer readable medium format having two video streams is provided. According to one implementation, the computer readable medium may be a Blu-ray disc in which one video stream may be used as a video overlay to a second video stream. Then, in step 320, the bandwidth of both streams may be increased such that each stream may be capable of displaying the video data or being stored in full resolution. In one implementation, each stream may exhibit a bandwidth (e.g., 10 Mb/s, 20 Mb/s) not to exceed a total of 40 Mb/s for the composite first and second stream, according to the current Blu-ray specification. According to methods of the present disclosure, each of the first and second streams may be stored at high resolution, such as at least 1080 p, for example. Furthermore, increasing the bandwidth for both streams may require a modification in the storage medium format. The storage medium, therefore, may be modified to store each of a first stream and a second stream at 40 Mb/s or a composite 80 Mb/s for the combined bandwidth of the first stream and second stream.

Next, a visual information source such as stereoscopic 3D source content, for example, may be received in step 330. The stereoscopic 3D source content may contain stereoscopic 3D data related independently to the left eye and the right eye. The original bandwidth of each of the left eye video data and right eye video data, may be 20 Mb/s. Various components of the IHS, including the CPU, memory, graphics subsystem, or the like, may receive and/or handle the visual information from the source content. Specifically, the memory management component of the software application residing on the IHS may receive the left and right eye video data for each frame of an image. The compositor component of the software application may extract particular regions of left and right eye video data for each frame from the memory management component to reformat the content of the video data to output for a particular display type.

In step 340, the left eye data of the stereoscopic 3D source content may be stored in a first stream on a storage medium while in step 350, the right eye video data of the stereoscopic 3D source content may be stored in a second stream on the storage medium. Each stream of video data may provide a maximum bandwidth of 40 Mb/s to enable the video data to be stored at full resolution. By way of example only, a source content providing 20 Mb/s of right eye video data may be stored within a stream on a storage medium at 40 Mb/s. Thus, the original bandwidth The graphics subsystem (e.g., graphics driver) of the IHS may be called upon by the compositor component of the software application to store a local copy of the composite streams (i.e., first or primary and second or secondary) into memory of the graphics subsystem. Further, the composite streams of visual information may be output to a display device using one or more digital output connections.

Currently, the Blu-ray Disc specification limits the bandwidth the combined video stream (i.e., right eye video stream and left eye video stream) to 40 Mb/s of data. Methods disclosed herein allow for an increase in the bandwidth of the combined video stream not to exceed 80 Mb/s of data. Thus, the present disclosure may enable the storing of visual information, such as stereoscopic video data, in two separate streams (e.g., primary stream, secondary stream), each stream capable of storing up to 40 Mb/s for a total not to exceed 80 Mb/s and displaying such visual information in full resolution. Consequently, degradation in visual quality associated with the compression techniques of some encoding methods may be reduced.

Furthermore, methods of the present disclosure, detailed description and claims may be presented in terms of logic, software or software implemented aspects typically encoded on a variety of media or medium including, but not limited to, computer-readable medium/media, machine-readable medium/media, program storage medium/media or computer program product. Such media, having computer-executable instructions, may be handled, read, sensed and/or interpreted by an IHS. Generally, computer-executable instructions, such as program modules, may include routines, programs, objects, components, data structures, and the like, which perform particular tasks, carry out particular methods or implement particular abstract data types. Those skilled in the art will appreciate that such media may take various forms such as cards, tapes, magnetic disks (e.g., floppy disk or hard drive) and optical disks (e.g., compact disk read only memory ("CD-ROM") or DVD). It should be understood that the given implementations are illustrative only and shall not limit the present disclosure.

Although the present disclosure has been described with reference to particular examples, embodiments and/or implementations, those skilled in the art will recognize that modifications and variations may be made without departing from the spirit and scope of the claimed subject matter. Such changes in form and detail, including use of equivalent functional and/or structural substitutes for elements described herein, fall within the scope of the appended claims and are intended to be covered by this disclosure.

What is claimed is:

1. A method for storing visual information on a storage medium, the method comprising:
   receiving a first visual information corresponding to a left eye and a second visual information corresponding to a right eye, wherein the visual information includes stereoscopic three-dimensional 3D video data;
   storing the first visual information in a first stream and the second visual information in a second stream on the storage medium;
   increasing the bandwidth of both the first stream and the second stream to display the first visual information and the second visual information at a display resolution of at least 1080 p; and
   storing the first stream and the second stream each on the storage medium at at a rate of at least 40 Megabits per second and at a display resolution of at least 1080 p.

2. The method of claim 1, wherein the storage medium is a Blu-ray Disc.

3. The method of claim 1, further comprising encoding the first stream in a first format and the second stream in a second format, wherein the first format is distinct from the second format.

4. The method of claim 3, wherein each of the first format and the second format is selected from a group consisting of the Movie Pictures Expert Group-2 (MPEG-2) format, the MPEG-4 format, and the Society of Motion Picture and Television Engineers (SMPTE) VC-1 format.

5. The method of claim 1, wherein the first stream and the second stream are increased to the same bandwidth.

6. An information handling system (IHS) comprising:
a storage medium operable to store a first stream of visual information corresponding to a left eye and a second stream of visual information corresponding to a right eye, wherein:
the visual information includes stereoscopic three-dimensional (3D) video data;
the bandwidth of the first stream and the second stream are increased to display the first visual information and the second visual information each at a resolution of at least 1080 p, and
the first stream and the second stream each stored at a rate of at least 40 Megabits per second and a resolution of at least 1080 p; and
a playback device operable to read the storage medium and display the visual information.

7. The system of claim 6, wherein the storage medium is a Blu-ray Disc.

8. The system of claim 6, wherein the first stream is encoded in a first format and the second stream encoded in a second format, the first format distinct from the second format.

9. The system of claim 8, wherein each of the first format and the second format is selected from a group consisting of the Movie Pictures Expert Group-2 (MPEG-2) format, the MPEG-4 format, and the Society of Motion Picture and Television Engineers (SMPTE) VC-1 format.

10. The system of claim 6, wherein the first stream and the second stream have the same bandwidth.

11. The system of claim 6, wherein the storage medium is a Blu-ray Disc.

12. A method for storing visual information in an information handling system (IHS), the method comprising:
providing a storage medium to store a first stream and a second stream of visual information;
receiving a first visual information corresponding to a left eye and a second visual information corresponding to a right eye;
increasing the bandwidth of both the first stream and the second stream to display the first visual information and the second visual information each at a display resolution of at least 1080 p;
storing the first visual information in the first stream and the second visual information in the second stream; and
storing the first stream and the second stream on the storage medium at a rate of at least 40 Megabits per second and at a display resolution of at least 1080 p.

13. The method of claim 12, wherein the storage medium is a Blu-ray Disc.

14. The method of claim 12 further comprising:
encoding the first stream in a first format and the second stream in a second format, wherein the first format is distinct from the second format.

* * * * *